US007355506B2

(12) United States Patent
Chandley

(10) Patent No.: US 7,355,506 B2
(45) Date of Patent: Apr. 8, 2008

(54) SYSTEMS AND METHODS FOR DETERRING THEFT OF ELECTRONIC DEVICES

(75) Inventor: Adrian Mark Chandley, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 438 days.

(21) Appl. No.: 10/676,967

(22) Filed: Oct. 1, 2003

(65) Prior Publication Data

US 2005/0073389 A1    Apr. 7, 2005

(51) Int. Cl.
G05B 19/00 (2006.01)
G06F 7/00 (2006.01)
G06K 19/00 (2006.01)
H04B 1/00 (2006.01)
H04L 9/14 (2006.01)

(52) U.S. Cl. .............. 340/5.31; 340/5.21; 340/5.28; 340/571; 340/426

(58) Field of Classification Search ........... 340/5.31, 340/5.21, 5.28, 5.3, 571, 572.1, 572.8, 426, 340/567; 713/201; 235/382; 455/410–411, 455/418, 343
See application file for complete search history.

(56) References Cited

U.S. PATENT DOCUMENTS

| | | | |
|---|---|---|---|
| 5,406,261 A | | 4/1995 | Glenn et al. |
| 5,515,419 A | * | 5/1996 | Sheffer .................... 455/456.5 |
| 5,729,192 A | * | 3/1998 | Badger .................... 340/426.12 |
| 5,748,084 A | | 5/1998 | Isikoff .................... 340/568 |
| 5,966,081 A | * | 10/1999 | Chesnutt .................... 340/5.64 |
| 6,011,473 A | * | 1/2000 | Klein .................... 340/571 |
| 6,087,937 A | * | 7/2000 | McCarthy .................... 340/567 |
| 6,151,493 A | * | 11/2000 | Sasakura et al. ............ 455/421 |
| 6,185,688 B1 | | 2/2001 | Greaves et al. ............. 713/201 |
| 6,269,392 B1 | | 7/2001 | Cotichini et al. ........... 709/200 |

(Continued)

FOREIGN PATENT DOCUMENTS

EP    0 899 647    3/1999

(Continued)

OTHER PUBLICATIONS

"Microsoft Presents Smart Personal objects Technology (SPOT)-Based Wristwatches at CES, Leading Watch Manufacturers Citizen, Fossil and Suunto Unveil Wristwatches that make Personalized, Web-Based Information Available at a Flick of the Wrist", http://www.microsoft.com/presspaass/press, Jan. 2003, XP-002304128.

(Continued)

Primary Examiner—Brian Zimmerman
Assistant Examiner—Nam Nguyen
(74) Attorney, Agent, or Firm—Woodcock Washburn LLP

(57) ABSTRACT

Systems and methods for remotely shutting down or preventing operation of device via a wireless network infrastructure are provided. The device may be disabled using a defined command the device receives on a wide area network, such as a SPOT network or wireless carrier network. In various embodiments, the device responds to pre-defined command(s) and operation is disabled locally. Override codes may be used to locally re-enable the device. In a "keep alive" embodiment, the device operates as long as it continues to receive "keep alive" messages from the intended environment.

25 Claims, 7 Drawing Sheets

U.S. PATENT DOCUMENTS

| | | | | |
|---|---|---|---|---|
| 6,433,685 | B1 * | 8/2002 | Struble et al. | 340/571 |
| 6,577,239 | B2 * | 6/2003 | Jespersen | 340/572.1 |
| 6,618,580 | B2 * | 9/2003 | Parrott et al. | 340/7.33 |
| 6,782,251 | B2 * | 8/2004 | Kagay, Jr. | 455/410 |
| 7,034,659 | B2 * | 4/2006 | Ungs | 340/5.74 |
| 2001/0045884 | A1 | 11/2001 | Barrus et al. | |
| 2002/0016838 | A1 | 2/2002 | Geluc et al. | 709/224 |

FOREIGN PATENT DOCUMENTS

| | | |
|---|---|---|
| GB | 2 304 250 | 3/1997 |

OTHER PUBLICATIONS

"Chips Support Design of Secure RKE Applications," *Microwaves &RF*, Nov. 1995, vol. 35, N11, p. 102.

Howe, Jr., Harlan.; Blanchard, Christine, "Wireless Technology for Automobile Theft Prevention," *Microwave Journal*, Penton Publishing Inc., Cleveland, Ohio, Jan. 1994, vol. 37, N1, pp. 24, 27, 28 & 30.

Zou, Yu-ming; Feng, Qing-dong; Zhang, Hai-zhen, "The Application of Anti-Theft Unit in Wireless Load Management System," *Electric Power Automation Equipment*, Editorial Office of Electrical Power Automation Equipment, China, Jun. 2002, vol. 22, No. 6, pp. 68-70.

Andress, Mandy, "Wireless LAN Security," *Information Systems Security*, Auerbach Publications, Jul.-Aug. 2002, vol. 11, No. 3, pp. 29-33.

Tang, Jian; Veijalainen, Jari, "Using Agents to Improve Security and Convenience in Mobile E-Commerce," *Proceedings of the 34th Annual Hawaii International Conference on System Sciences*, Maui, HI, USA, IEEE Comput. Soc, Los Alamitos, CA, USA, Jan. 3-6, 2001 (English abstract attached).

Wunnava, Subbarao V., "Web Based Remote Security System (WRSS) Model Development," *Proceedings of the IEEE Southeast Con 2000*, Nashville, TN, USA, IEEE, Piscataway, NJ, USA, Apr. 7-9, 2000, pp. 379-382.

Davis, Ben; DeLong, Ron, "Combined Remote Key Control and Immobilization System For Vehicle Security," *IEEE Power Electronics in Transportation*, Dearborn, MI, USA, IEEE, New York, NY, USA, Oct. 24-25, 1996, pp. 125-132.

Parnell, Karen, "Xilinx Technology Can Disable Stolen Cell Phones—and Restore Them When Recovered," *Xcell Journal*, 2002, 3 pgs.

McDonald, H. et al., "Design document for: GTS: GPS Tracking System", submitted toi Dr. Joseph Picone, ECE4532-ECE Senior Design I, Department of Electrical and Computer Engineering, Mississippi State University, Mississippi State, Mississippi 39762, 2003, 13 pgs.

* cited by examiner

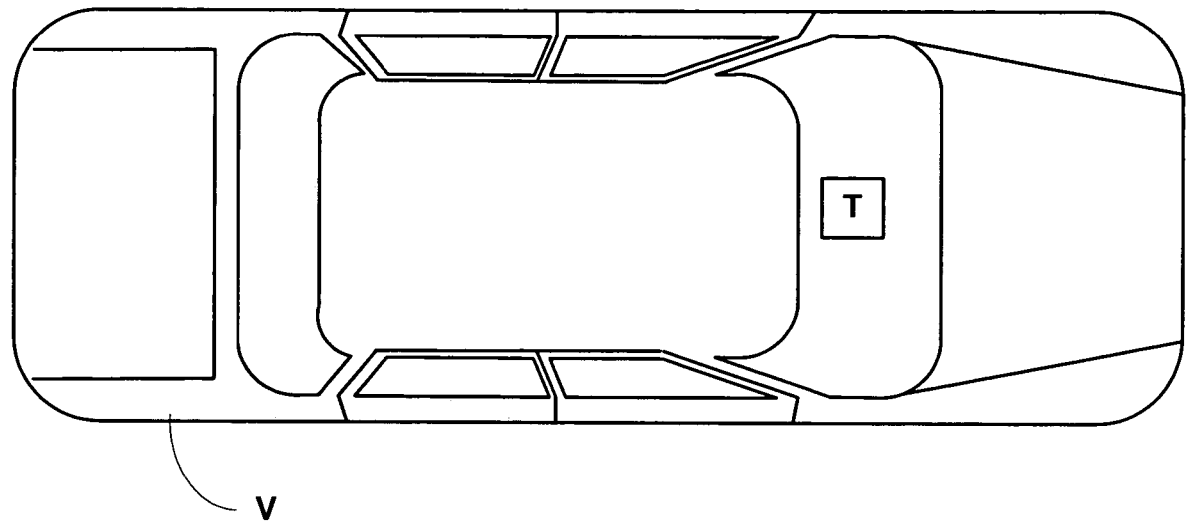
FIG. 1A - Prior Art
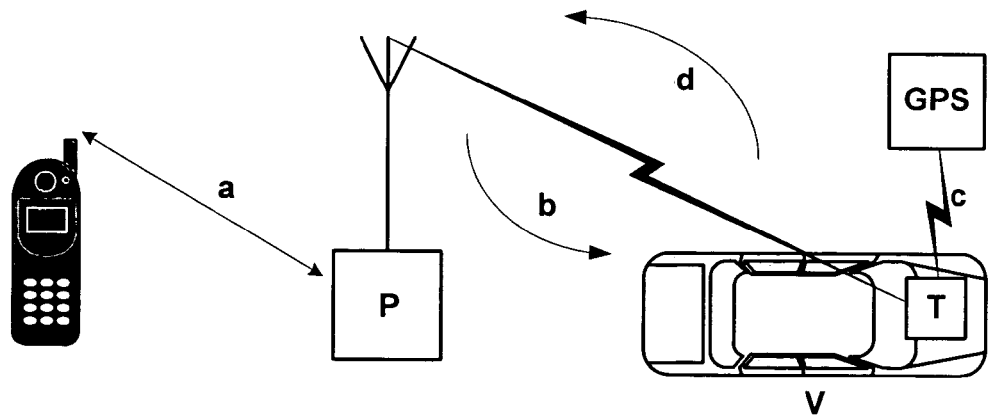
FIG. 1B - Prior Art

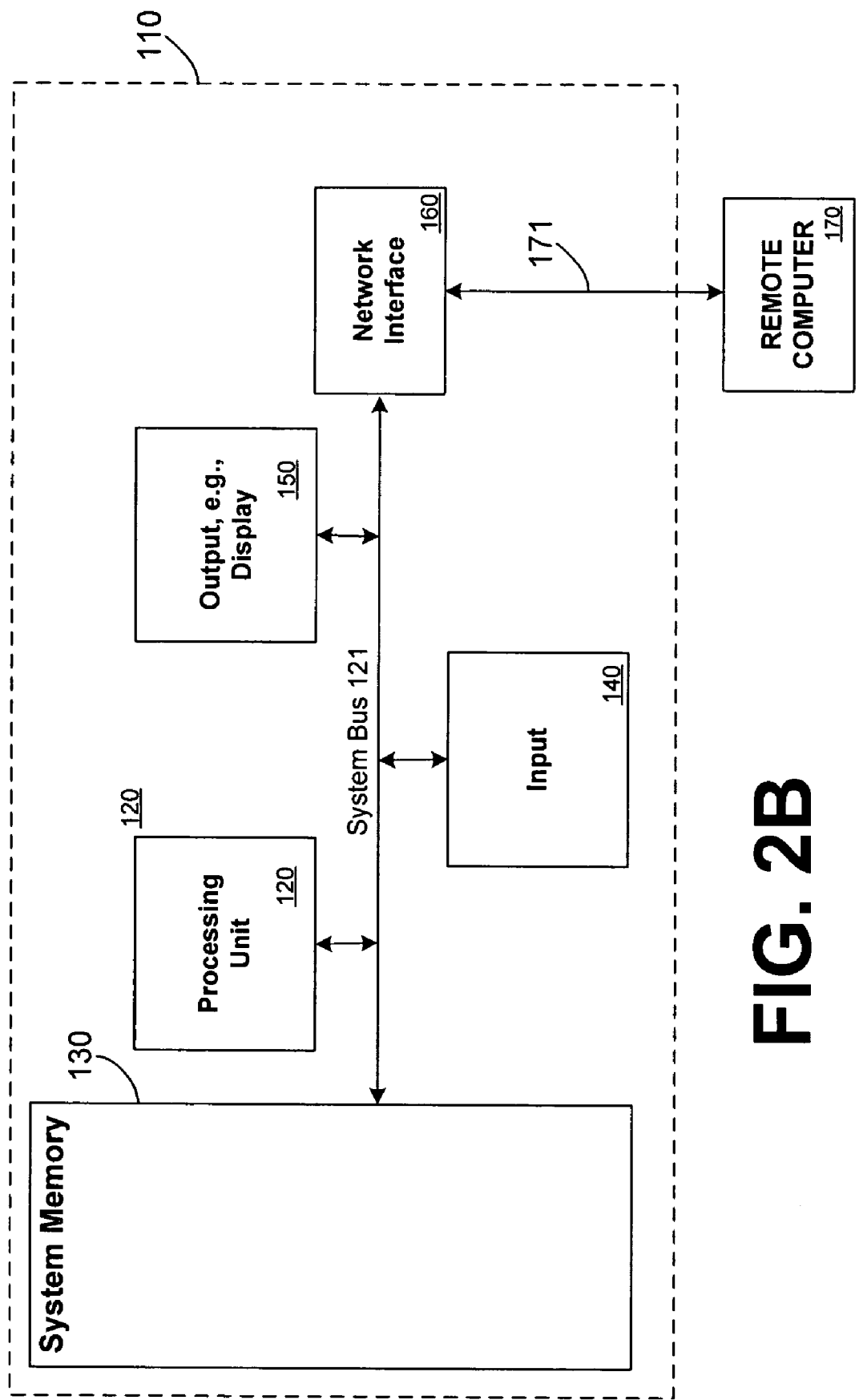

SYSTEMS AND METHODS FOR DETERRING THEFT OF ELECTRONIC DEVICES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003, Microsoft Corp.

FIELD OF THE INVENTION

This invention relates to disabling devices in the event of loss or theft, to prevent further operation of a lost device. More particularly, the invention relates to scalable systems and methods for remotely shutting down or preventing full operation of a device via a wireless network infrastructure.

BACKGROUND

Theft of property of any kind is a risk any consumer, or insurer, undertakes when property is purchased. As computing devices, such as laptops, cell phones, smart devices, personal digital assistants (PDAs), MP3 players, etc. continue to proliferate, deterring theft of those devices in a simple and cost effective manner will appeal to consumers of all types. Today, no such simple means exists for deterring theft of computing devices of all varieties and kinds. As these devices continue to proliferate in the marketplace, the ability to include such a simple, but effective means for deterring theft will be of predictable significance in the marketplace.

There are related systems which attempt to address theft deterrence of personal property. For instance, a fair amount of attention has been devoted to car theft, a crime that leaves the owner of a stolen vehicle in a seemingly helpless situation. The problem is that once a vehicle is stolen, the vehicle can be hidden fairly easily so that it is out of the plain view. Searching for a stolen vehicle can be time consuming since vehicles can be moved over great distances relatively quickly.

In this regard, automobile theft protection devices have been around for approximately 30 years, with most of these devices focus on deterring theft. However, a recent trend has been towards the recovery of stolen vehicles as well. There are now several products that aid in stolen vehicle recovery. These devices include vehicle identification numbers, window etching, steering wheel locks, brake and gas pedal locks, transmission locks, car alarm cut off switches, and police trackers. While many of these devices lower the chances of vehicle theft, few increase the odds of recovering a stolen vehicle. What is lacking in many of these devices is the ability to automatically contact the owner and report that the vehicle has been stolen, which makes vehicle recovery a tedious process as hidden vehicles are difficult to find. Moreover, these solutions are tailored to particular components of the vehicle, such as the gas pedal, and thus are custom jobs, not portable to other components of the vehicle.

Some car tracking systems place a global positioning system (GPS) device in the vehicle so that the device can report the location of the car to a computer, which displays the car's location on a map. One such company that implements such a system is LoJack, Inc. under product name LoJack. LoJack is a device that is installed in a vehicle but is normally turned off. When the owner of the vehicle notices that their car has been stolen, they call LoJack, Inc. (or the police) and the device is enabled for tracking the vehicle.

As illustrated in FIG. 1A, the LoJack system consists of installing a small, silent transmitter T in a hidden place in the vehicle V allowing the police to track the transmitter T. Thus, as illustrated in FIG. 1B, when a user suspects vehicle theft, the user places a call into police station P (step a). Then, the police transmits a signal to transmitter T (step b), which retrieves its location via GPS technologies (step c) and transmits its location to the police station P (step d) so that the police can track down the physical location of the car. Thus, LoJack becomes activated once the police are involved. Other ways of triggering steps b-d can be employed as well. For instance, LoJack can be used in conjunction with a shock sensor with customized sensitivity so that when the car is alarmed, a sudden jar to the car triggers the operation of transmitter T. Similarly, a perimeter sensor can be employed that detects entry into the vehicle through motion detection technology.

Major drawbacks to the LoJack system include: (1) the time for the transmitter T to report its position can be as much as an hour, (2) LoJack typically doesn't automatically activate itself to report that it is being stolen, (3) the transmitter T cannot be transferred from one vehicle to another, (4) GPS works effectively only if the vehicle is outdoors, (5) the LoJack device, if discovered, can be removed by clever thief and (6) it is only available in a few states and major cities.

Other GPS tracking systems have been proposed that reduce the time it takes to locate a stolen vehicle by having a device automatically report its position. For instance, the system proposed in Dr. Joseph Picone's "GTS: GPS Tracking System" (March, 2003) is set apart from other vehicle tracking solutions in that the owner can track their vehicle. The GTS proposes a system (A) wherein it can be detected that the vehicle has been stolen, (B) wherein the transmitter can determine its location by latitude and longitude, (C) wherein the transmitter can report its position to the owner of the vehicle, (D) wherein the owner can disable the car from his or her own personal computer, (E) wherein the transmitter is small enough to remain discreetly hidden in the vehicle, (F) wherein the device operates with low enough power consumption in sleep mode so that the device does not quickly drain the car battery while the vehicle is parked, (G) wherein an optional battery backup is included in case the car battery is disconnected and (H) wherein the owner is allowed to poll the GTS for its location, whether the car is stolen or not.

In order to detect that the vehicle has been stolen, the proposed GTS requires the use of a previously installed car alarm. It monitor the activity of the car alarm siren to determine if it is being stolen, and it differentiates between the car alarm being armed, disarmed, or set off. If the vehicle begins to move, the GTS uses a cellular modem to report its position to the owner. Disabling the vehicle can be accomplished by opening a relay that is used to remove power from the vehicle's fuel pump.

If it does not have a car alarm with which to work, the owner can still contact the GTS from a computer and disable the car, but the GTS will not automatically detect when the car has been stolen.

The problem remains, however, that a proficient thief can disable or bypass nearly any car alarm. In this regard, neither LoJack, nor GTS (or any other system that hides a device in a vehicle) are immune to such practices. Accordingly, while the device remains hidden so that it can operate inconspicuously, a clever thief will determine the location of the device and disable its operation.

Thus, tracking systems for vehicles would suffer from a number of disadvantages if one attempted to apply them to wireless computing devices. Specifically, as noted, GPS works well only if it is outdoors. Moreover, as a physically divisible component of the car, the transmitter device can be removed if discovered.

However, there has been some effort devoted to tracking laptops. According to insurance company, Safeware, Inc., 591,000 laptops were stolen in the U.S. in 2001, with an estimated 95% of the stolen laptops never recovered. Thus, various anti-theft tracking software and hardware have been developed to provide a last line of defense against permanent loss of laptop and data, which come into play after the laptop is taken.

Exemplary anti-theft tracking software works as follows. First, software is purchased and installed on a laptop. Once the software is installed, a small, hidden tracking program is activated. This program runs in the background. The software communicates with a monitoring point, dependent on the laptop being connected to the Internet. One possibility is that through the Internet, the program occasionally sends it's location to a monitoring server or email address. Another method is that it provides location information only when you report it stolen and a recovery effort is initiated.

If the laptop is stolen, the monitoring and recovery center is contacted. Most software comes with a recovery service which is initiated when you call and report your laptop stolen by phone, email or on the Web. The recovery process then starts with the monitoring company attempting to contact the stolen computer. If it is found connected to the Internet, the company attempt to work with law enforcement to recover the laptop by obtaining information about the IP address from the Internet Service Provider (ISP).

Not all tracking software survives the hard drive being formatted. Also, sometimes, if a piece of hardware can be installed, such as an add-on board, or if the hard drive is removed, the PC tracking software no longer functions. Moreover, a thief should not be able to Remove or Uninstall the software to turn off the tracking or use a Process Viewer to view and kill the program. In essence, because PC tracking is software, it is easily circumvented by sophisticated hackers.

Another proposed system, termed the Xilinx solution, provides tools to combat phone theft. Xilinx proposes remote disabling of the keypad of a cell phone by the mobile phone operator using IRL (Internet Reconfigurable Logic) technology. When returned to its owner, the handset can then be reprogrammed via an IRL bitstream to enable the keypad again. IRL technology enables the remote upgrading or programming process of CPLD (Complex Programmable Logic Devices) or FPGA (Filed Programmable Gate Arrays) hardware over any kind of network, including wireless. Using the Xilinx solution, it is virtually impossible for the cell phone to be reactivated or for data to be retrieved from the handset by the thief or hacker.

The design security aspects of Xilinx are not only buried within the layers of the device, but are also scattered throughout the die to make their detection impossible. Accordingly, Xilinx provides the following design security combination: (1) Prevention of accidental/purposeful overwriting or read back of the configuration pattern, (2) Blocking visual or electrical detection of the configuration pattern, (3) Automatic device lockdown in response to electrical or laser tampering and (4) Physical implementation of the protection scheme that is virtually undetectable.

By utilizing Xilinx to remotely disable the hardware within a stolen mobile phone, phone operators and manufacturers can help remove the incentive for theft. While the Xilinx solution provides some advantage to consumers and manufacturers alike, the Xilinx solution uses microcontrollers as a functional requirement of the design, e.g., the keyboard interface, which allow remote disabling of that function. Accordingly, to implement the Xilinx solution, specific design choices relating to microcontroller selection are required in order to integrate them the solution into existing designs. Additionally, the design is hardwired such that to apply the technology to a different part of the cell phone, e.g., the antenna, one would need to re-design the microcontroller requirements from scratch. Moreover, the Xilinx solution describes disabling only one part of the overall system.

Still further, the Xilinx solution does not have a network transport (wireless or otherwise) built in, since it relies on some form of communications network being available as part of the device being protected, nor does Xilinx contemplate in advance any form of network infrastructure. The Xilinx solution also discloses that the instruction to disable devices is transmitted over an Internet connection (IRL) highlighting the need for a high level Internet connection and corresponding Internet service provider to be available to the device.

From a consumer perspective, reducing the potential concern about theft or loss of property can remove a block to purchase electronic goods. Accordingly, there is a need in the art for a way of deterring theft of computing devices that is simple and cost-effective. Further, there is a need for a way to deter theft that may be applied to multiple parts of the computing device. Still further, there is a need for a way to deter theft that leverages an existing network transport of an existing network infrastructure via the inclusion of a wireless component, which cannot be easily removed.

SUMMARY OF THE INVENTION

In consideration of the above-identified shortcomings of the art, the present invention provides systems and methods for remotely shutting down or preventing operation of device via a wireless network infrastructure. The device may be disabled using a defined command the device receives on a wide area network, such as a smart personal objects technology (SPOT) network or wireless carrier network. With the embodiments of the invention, the device responds to defined command(s) and operation is disabled locally. Override codes may be used to locally re-enable the device. In a "keep alive" embodiment of the invention, the device operates while it continues to receive "keep alive" messages from the intended environment. Upon a timeout condition whereby no "keep alive" message has been received, the device is disabled similar to other embodiments of the invention.

Other advantages and features of the invention are described below.

BRIEF DESCRIPTION OF THE DRAWINGS

The systems and methods for remotely disabling devices in accordance with the present invention are further described with reference to the accompanying drawings in which:

FIGS. 1A and 1B illustrate an exemplary prior art automobile tracking technique;

FIG. 2B is a block diagram representing an exemplary non-limiting computing device in which the present invention may be implemented;

DETAILED DESCRIPTION OF THE INVENTION

Overview

Figure 2A:
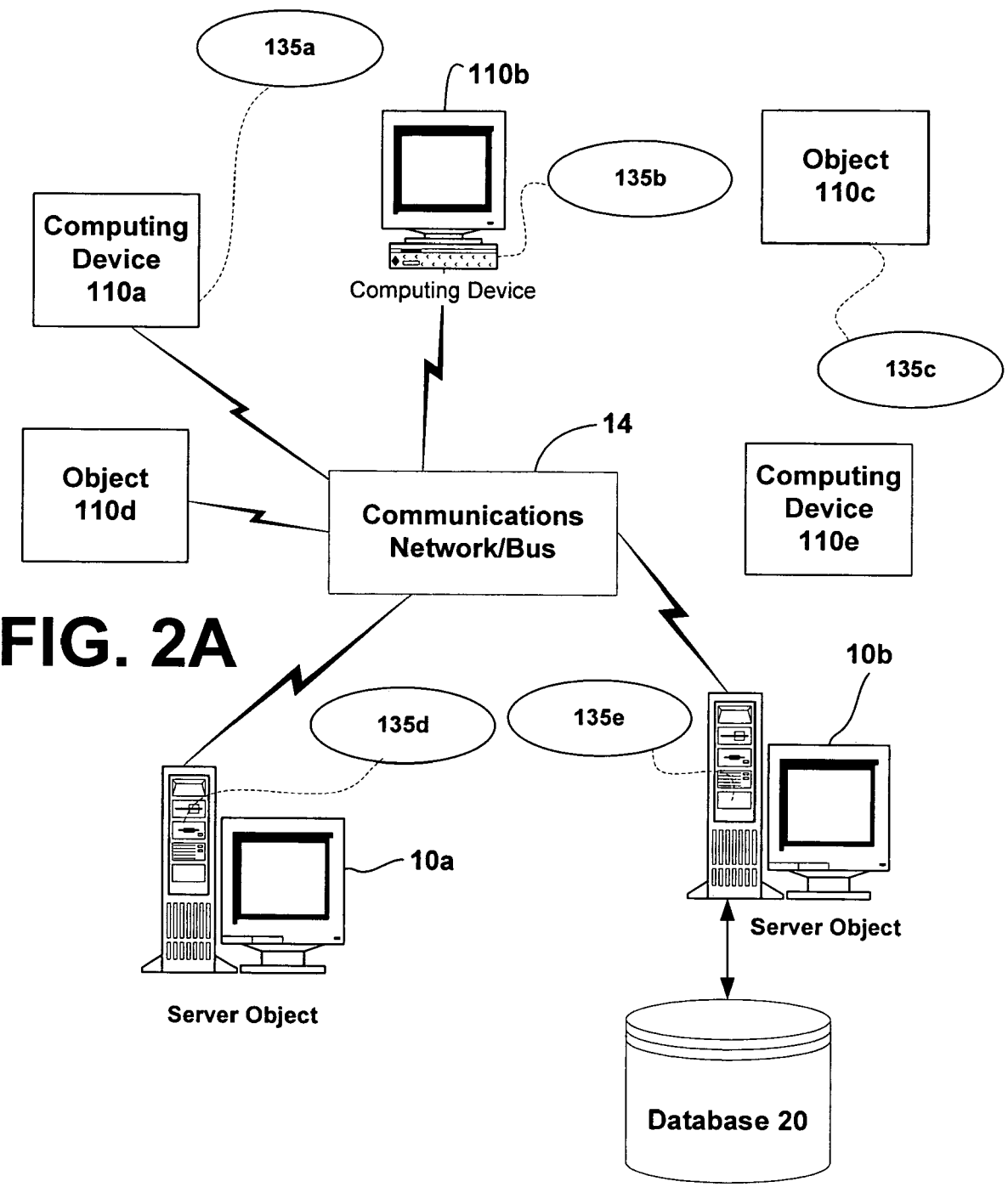
FIG. 2A is a block diagram representing an exemplary network environment having a variety of computing devices in which the present invention may be implemented.

The invention provides low cost theft/loss prevention solutions to PCs and other electronic devices such as audio/video players, digital cameras, camcorders, PDAs, etc. In one embodiment, the invention uses smart personal objects technology (SPOT) to provide advantageous results relative to other existing network infrastructures.

The following scenarios describing loss of a device and resulting benefits enabled by the invention should be considered exemplary and non-limiting, but nonetheless illustrative of advantages of embodiments of the invention that are readily portable to the marketplace.

In a first example, a user's Tablet might be stolen at an airport. By merely accessing a Web site, with the user identifying herself, the Tablet is disabled except for a notification providing information to the finder and offering a reward for its return.

In a second example, an iPod music player or digital camera is left on the beach. Having signed up for an insurance option on a Web site, the claimant reports the loss to the insurance company who disables the item and takes appropriate action on behalf of the claimant.

In a third example, a couple of laptops are stolen from a small company. The company's administrator reports the loss on a Web site. As a result, the next time the stolen systems are turned on, they display a notification that the system is listed as stolen. The stolen systems also attempt to route alerts to monitoring servers.

In a fourth example, a number of PCs have been removed from a large corporation. Since the system administrator was using a "keep alive" function of auditing tools, the systems become automatically disabled within a few hours of being removed.

In a fifth example, a major OEM loses a significant number of completed systems as a result of theft in a distribution channel. The distribution manager is able to significantly reduce insurance costs as a result of the invention being applied to the stolen (and future) systems.

As described in more detail below, the invention addresses the need created by all of the above-described scenarios and more.

Exemplary Networked and Distributed Environments

One of ordinary skill in the art can appreciate that the invention can be implemented in connection with any electronic device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for remotely disabling a device in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. The invention is particularly relevant to those computing devices that operate in a wireless network, although not limited thereto.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may be of great value to a third party wishing to abscond with the device.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to implement processes for remotely disabling devices in accordance with the invention. Any one of the computing objects or devices 10a, 10b, 110a, 110b, 110c, etc. may also incorporate component(s) that enable a device to be remotely disabled in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to reporting a loss or remotely disabling a device according to the present invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. For instance, any software objects utilized pursuant to reporting a loss in accordance with the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to have extra assurance against third party unauthorized use.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

FIG. 2B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere that a device with value is located is a device that can benefit from the techniques of the invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the remote disabling techniques in accordance with the invention.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCD) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) and/or random access memory (RAM). A basic input/output system (BIOS), containing the basic routines that help to transfer information between elements within computer 110, such as during start-up, may be stored in memory 130. Memory 130 typically also contains data and/or program modules that are immediately accessible to and/or presently being operated on by processing unit 120. By way of example, and not limitation, memory 130 may also include an operating system, application programs, other program modules, and program data.

The computer 110 may also include other removable/non-removable, volatile/nonvolatile computer storage media. For example, computer 110 could include a hard disk drive 141 that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121 through a non-removable memory interface such as an interface, and a magnetic disk drive or optical disk drive is typically connected to the system bus 121 by a removable memory interface, such as an interface.

A user may enter commands and information into the computer 110 through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120 through user input 140 and associated interface(s) that are coupled to the system bus 121, but may be connected by other interface and bus structures, such as a parallel port, game port or a universal serial bus (USB). A graphics subsystem may also be connected to the system bus 121. A monitor or other type of display device is also connected to the system bus 121 via an interface, such as output interface 150, which may in turn communicate with video memory. In addition to a monitor, computers may also include other peripheral output devices such as speakers and a printer, which may be connected through output interface 150.

The computer 110 may operate in a networked or distributed environment using logical connections to one or more remote computers, such as a remote computer 170. The remote computer 170 may be a personal computer, a server, a router, a network PC, a peer device or other common network node, and typically includes many or all of the elements described above relative to the computer 110. The logical connections depicted in FIG. 2B include a network 171, such local area network (LAN) or a wide area network (WAN), but may also include other networks/buses. Such networking environments are commonplace in homes, offices, enterprise-wide computer networks, intranets and the Internet.

When used in a LAN networking environment, the computer 110 is connected to the LAN 171 through a network interface or adapter. When used in a WAN networking environment, the computer 110 typically includes a modem or other means for establishing communications over the WAN, such as the Internet. A modem, which may be internal or external, may be connected to the system bus 121 via the user input interface of input 140, or other appropriate mechanism. In a networked environment, program modules depicted relative to the computer 110, or portions thereof, may be stored in the remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (APT) or a "middle man" object, a control object, hardware, firmware, intermediate language instructions or objects, etc., such that the methods may be included in, supported in or accessed via all of the languages and services enabled by managed code, such as NET code, and in other distributed computing frameworks as well.

Systems and Methods for Deterring Theft of Electronic Devices

As described above in the background, electronic equipment such as PCs, Notebooks, personal audio players, cameras, etc. are vulnerable to theft or loss. There are choices available for tracking of automobiles; however, for the various described reasons, these choices are expensive and impractical for general electronic goods. Accordingly, the invention provides wireless activated theft deterrent methods and systems for PCs and other electronic devices, which are more suited to portable electronic goods. In various embodiments, the invention provides low cost techniques that allow a stolen piece of equipment to be disabled when the loss is discovered. The invention thus enables corporate customers and consumers alike to avoid suffering significant loss of property. By creating an affordable security system, the invention reduces the loss, and creates increased demand for equipment with the functionality of the invention.

The invention enables component(s) to be included in a device for shutting down or preventing operation of device, enabled by the receipt of a remote signal. The device may be disabled using a defined command the device receives on a wide area network, such as a SPOT network or wireless carrier network. With the embodiments of the invention, the devices themselves respond to defined command(s) and operation is disabled locally. Override codes may be used to locally re-enable the device. This differs from cell phone disabling in that the devices themselves respond to the defined command(s) and operation is disabled locally. By contrast, networked devices such as cell phones are not really disabled when stolen, just that their access to the appropriate network has been severed.

Using a wide area wireless reception component, such as Microsoft's SPOT or other technology such as a wireless pager using either broadcast or directed messages, an electronic device such as, but not limited to a PC, Notebook, personal audio player, camera, etc., can periodically listen for messages that may instruct the device to cease operation and indicate that the theft lock has been activated by message on display, or by a simple indicator lamp.

The availability of low cost wide area wireless systems such as SPOT make this invention feasible not just for high value high intelligence devices, such as PCs, but also other devices such as audio players, or cameras.

In a first embodiment, the "tags" of the invention include either a full, or cost reduced, version of existing SPOT based processing, as the system of the invention requires minimal processing capability. A lower cost CPU advantageously reduces the cost and power consumption of the tag components. The application of the present invention to the device is incorporated into existing designs, and thus is easily ported from one type of device to another type of device, without disturbance of existing designs. While advantageously, the tag technology of the invention can be implemented as an independent solution, for an additional layer of security, the invention can also be implemented as a function within the main circuit board for an existing product, or even within one of the component chipsets or application specific integrated circuits (ASICs), with little design change.

Figure 3A:
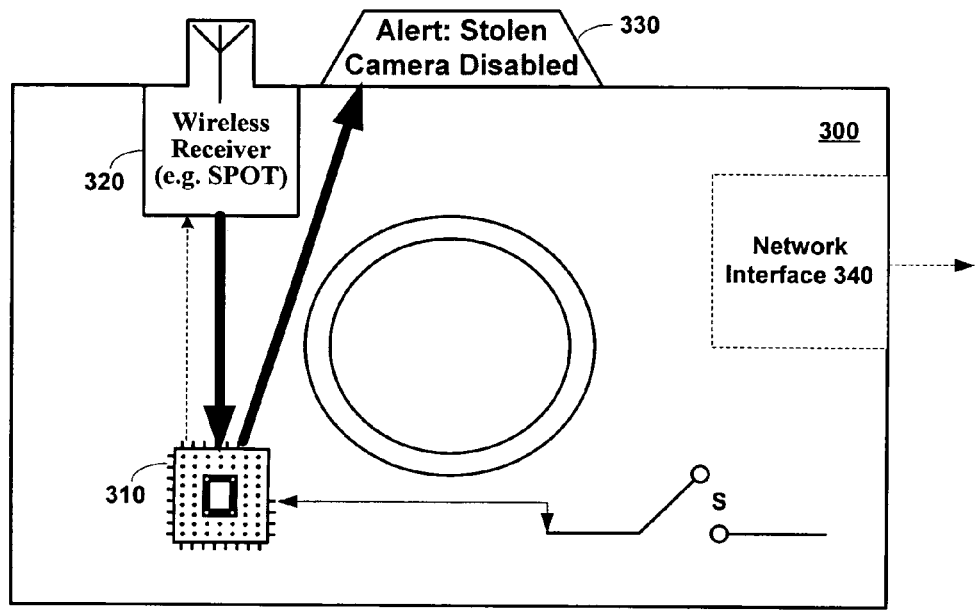
FIGS. 3A to 3D illustrate exemplary implementations of a device having a receiver and processing abilities according to various embodiments of the invention.

Thus, for example, FIG. 3A illustrates the inclusion of a tag into a typical device 300, such as a camera, in accordance with the invention. As mentioned, device 300 includes a minimal processor 310, capable of receiving a disable signal from wireless receiver 320, such as a SPOT receiver. The functionality of processor 310 can also easily be included, for instance, in processing unit 120 of an exemplary device 110, with minimal change in the design of the processing unit 120 (or software that works with processing unit 120). In an exemplary scenario, the owner of the camera 300 notices that the camera 300 is missing, and notifies the system of the invention of the loss. For instance, a user may be registered as a user at a Web site for reporting the device missing, or the user may contact an administrator of the system of the invention via email, or other conventional means, such as phone, fax, etc.

Once reported lost, a disable signal is broadcast from the network including a unique identifier associated with the receiver 320 and/or the processing means 310, which when received by receiver 320, causes the device 300 to become disabled. For instance, an exemplary way of disabling a device is to disconnect a switch S anywhere in the necessary electronics of the device. Whether it be an analog relay, a transistor switch, etc., that is rendered inoperable, the disabling operation of the invention can not easily be bypassed without knowledge of what is disabled in the device, or how it is disabled. In addition to disabling the device, processing means 310 can optionally cause a display 330 to indicate that the device is disabled, and/or that the device is presumed lost or stolen. Display 330 may also indicate to a recoverer of the device how to return the device, in exchange for some benefit, such as a reward. Encoding of the transmitted disabling signal can be (a) plain, (b) at least partially encrypted and/or (c) otherwise encoded.

Location reporting enhancements can also be added to the system of the invention. In alternate embodiments, the device 300, once disabled, may enter a state whereby it attempts to connect to a network, e.g., a wide are network such as the Internet, via network interface 350 (where the device independently connects to an alternate network) in an effort to aid recovery of the device. Device 300 may also send a signal back to the system of the invention via a wireless transmitter included in wireless receiver 320, i.e., component 320 may be a wireless transceiver. Traditionally known triangulation methodology may also be used to supplement the invention to discover the location of the device, once it is known that the device is lost. It should be understood, however, that a transmitter is not necessary, and merely an optional augmentation of the invention. An exemplary use of this option would be if, for instance, device 300 already had a connection to the Internet. In such a case, the device 300 could send out its internet protocol (IP) address and media access control (MAC) address to the appropriate authorities or administrator of the system of the invention, which would enable a third party to track down the physical location of the device. In more detail, if a stolen device has a connection to the Internet when in lockdown mode, it can transmit any known location information (e.g. TCP/IP routing) to a security monitoring service. It would also be feasible to have a stolen item use a short range SPOT network radio transmitter radio to transmit an alarm code that could be picked up by adjacent Spot equipped PCs, these PCs could in turn transmit location information back to the security monitoring service.

Figure 4:
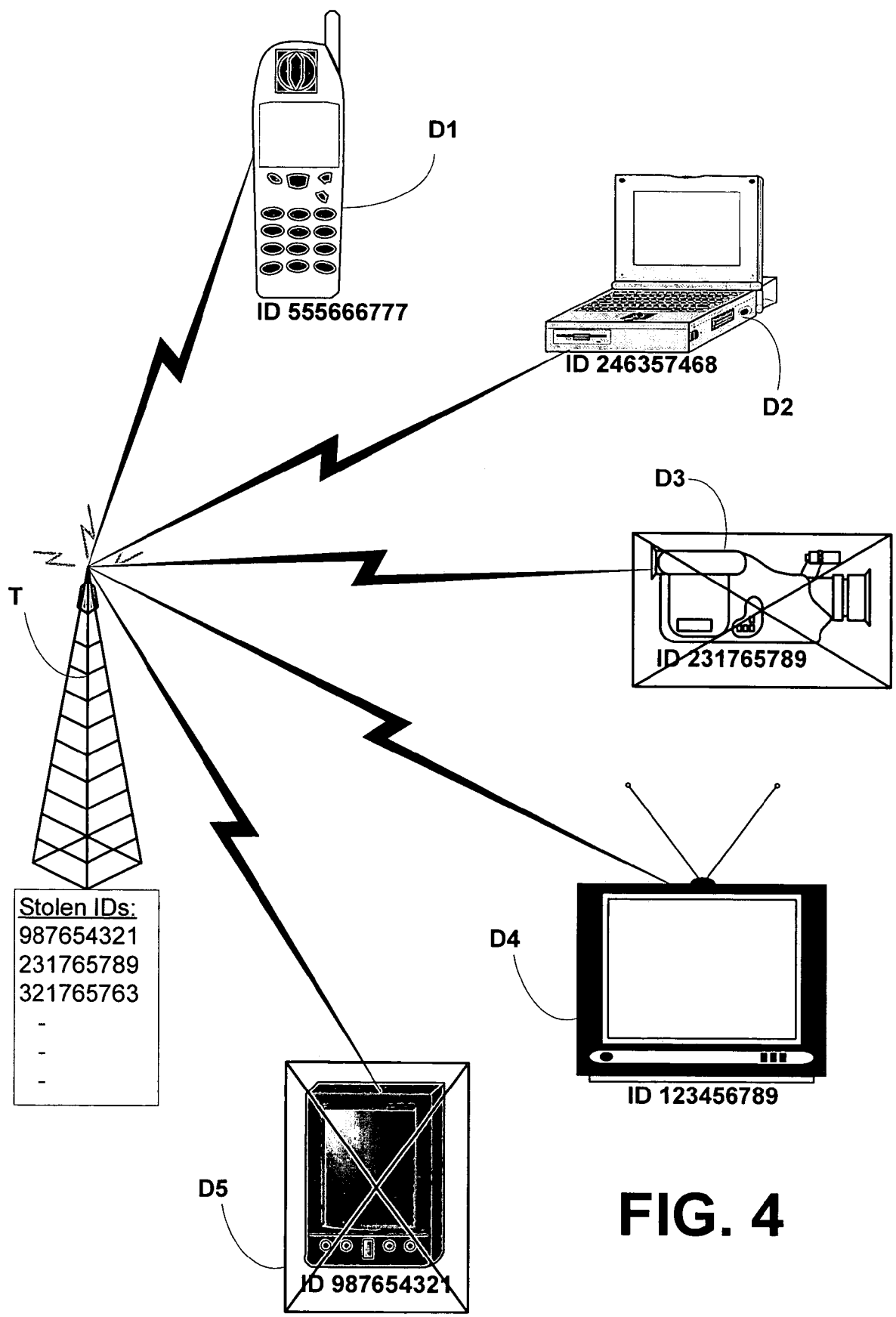
FIG. 4 illustrates an exemplary broadcasting to stolen devices alerting the device that it should disable in accordance with the invention.

As mentioned, once the owner of a device 300 discovers that the device is lost, the owner reports the loss via any of a variety of means. FIG. 4 illustrates an exemplary scenario, whereby a network is used to broadcast a disable signal to remote devices according to pre-determined rules once it is known which devices are lost. Thus, for each device provided with the functionality of processor 310 and wireless receiver 320, the invention assign a unique identifier. Accordingly, for each device reported stolen or lost, a list is compiled having the unique identifiers of the lost devices. Then, periodically, or according to a set schedule initiated when the device is discovered stolen, a signal can be broadcast using existing network infrastructure, e.g., the SPOT network, to deliver a list of stolen devices. Device 300 compares the list to its number, and if its number is in the list, processor 310 disables the device, for instance, by opening switch S. As mentioned, switch S may be a physical switch, a transistor switch, a relay, etc., or anything which disables the electronic device in response to disabling signal(s) initiated by the processor 310. For instance, the processor 310 itself may disable a part of processor 310 that is necessary to the functioning of the device, or switch S may be included in processor 310. By making the presence of processor 310 necessary to keeping switch S, or other portion, of the device 300 enabled, advantageously, the invention prevents removal of the processor 310 as a way to circumvent the invention.

Figure 3B:
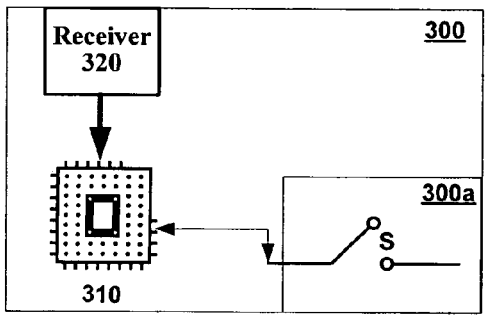
Figure 3C:
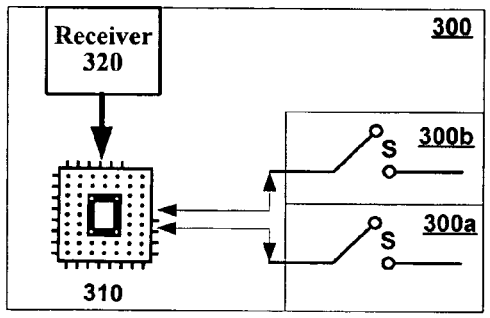
Figure 3D:
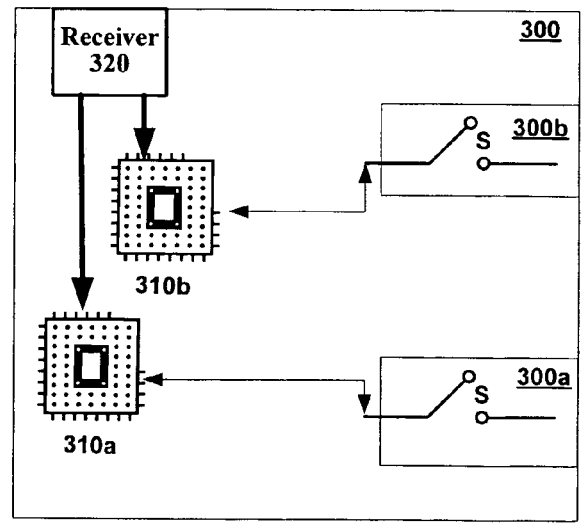

Since a device may include multiple divisible sets of components worth stealing, FIGS. 3B to 3D illustrate that the invention may be applied to multiple parts of a device 300. For instance, as shown in FIG. 3B, instead of disabling the entire device 300, the processor disables a subcomponent 300a of the device 300. As shown in FIG. 3C, instead of disabling a single subcomponent 300a, the embodiment illustrates the ability to disable multiple subcomponents 300a, 300b, etc. FIG. 3D illustrates an alternate embodiment where a separate processor is provided for each subcomponent (or component) to be disabled. For instance, processor 310a is used in conjunction with disabling subcomponent 300a and processor 310b is used in conjunction with disabling subcomponent 300b.

In FIG. 4, devices D1, D2, D3, D4 and D5 are in the vicinity of tower T of a larger existing network infrastructure, such as the SPOT network. Tower T broadcasts the stolen IDs according to a pre-defined protocol understood by the receiver/processor combinations included in the devices, and devices having a stolen ID included in the broadcast signal become disabled. In the example of FIG. 4, devices D3 and D5 are disabled as a result of the broadcast of stolen IDs 987654321 and 231765789.

Figure 5:
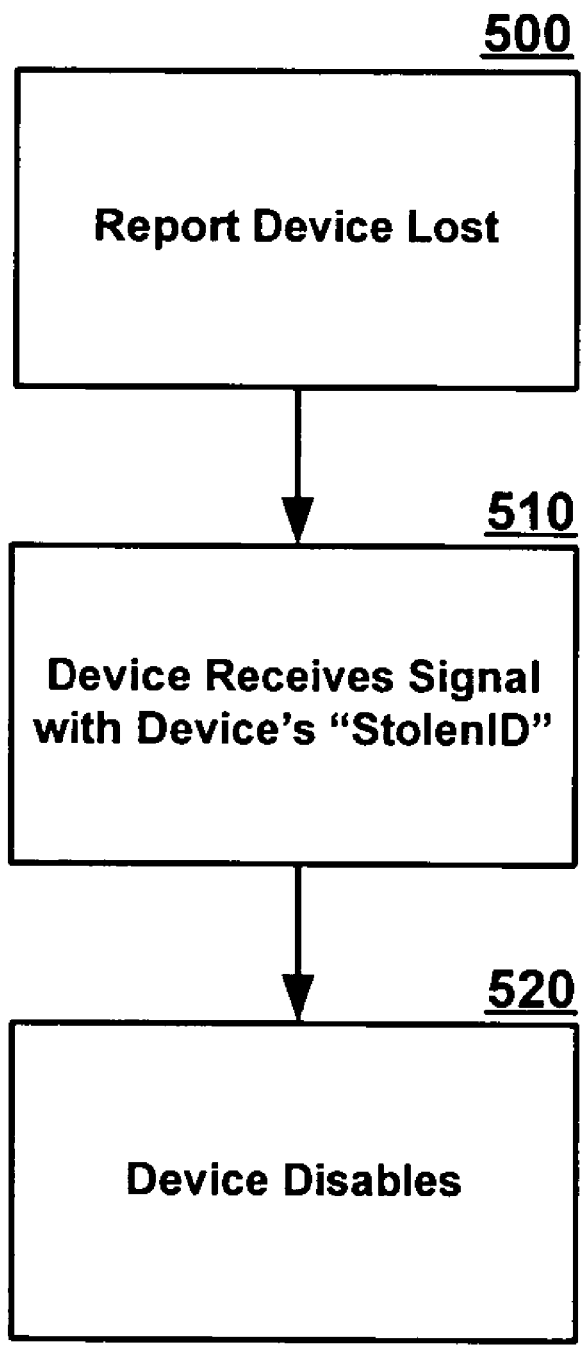
FIG. 5 depicts an exemplary flow diagram of exemplary embodiments of the invention.

FIG. 5 illustrates the invention via a flow diagram. At 500, the device 300 is reported stolen. At 510, the device 300 receives a message via receiver 310 and processed by processor 320, identifying the device as a lost device. At 520, the device is disabled by processor 320.

Any of the afore-described communications of the invention may be encrypted for additional security in order to prevent snooping on the network and discovery of the communication protocol(s) utilized according to the invention.

In further embodiments, for PC based solutions in managed networks, an additional mode of security can be added to the invention. In this case, the default setting would be that a system is disabled, and corporate administrators would direct special network "keep alive" packets to PCs configured with the tags of the invention to keep connected to the corporate network. Thus, should a system be removed from the corporate network, after the keep alive timeout has expired, the system would go into a lockdown mode until it received a new packet. Alternatively, if the system had been authorized to leave the network, the system administrator could log into a Web site, and change the mode of the system to default enabled, or send another keep alive message. As soon as the tag, i.e., the receiver/processor combination, received the message, it would unlock the system. The keep alive scheme would also allow the administrator to keep track of PC assets.

Exemplary Non-Limiting SPOT Network Implementation

Thus, the invention can be applied to a myriad of scenarios for disabling stolen goods to provide advantages to the device owners and insurers alike. In one embodiment, the invention uses the SPOT network infrastructure. By initial estimates, providing a design based on the SPOT network scales to over 1 billion devices, with every device having coverage at every SPOT location (for approximately 10 million stolen or lost items per year) while using less than 6% of available SPOT bandwidth. These numbers can be improved with simple compression techniques, and take no account of bandwidth gains from canceling alerts for recovered items, and also assume every lost device has worldwide coverage.

Figure 6:
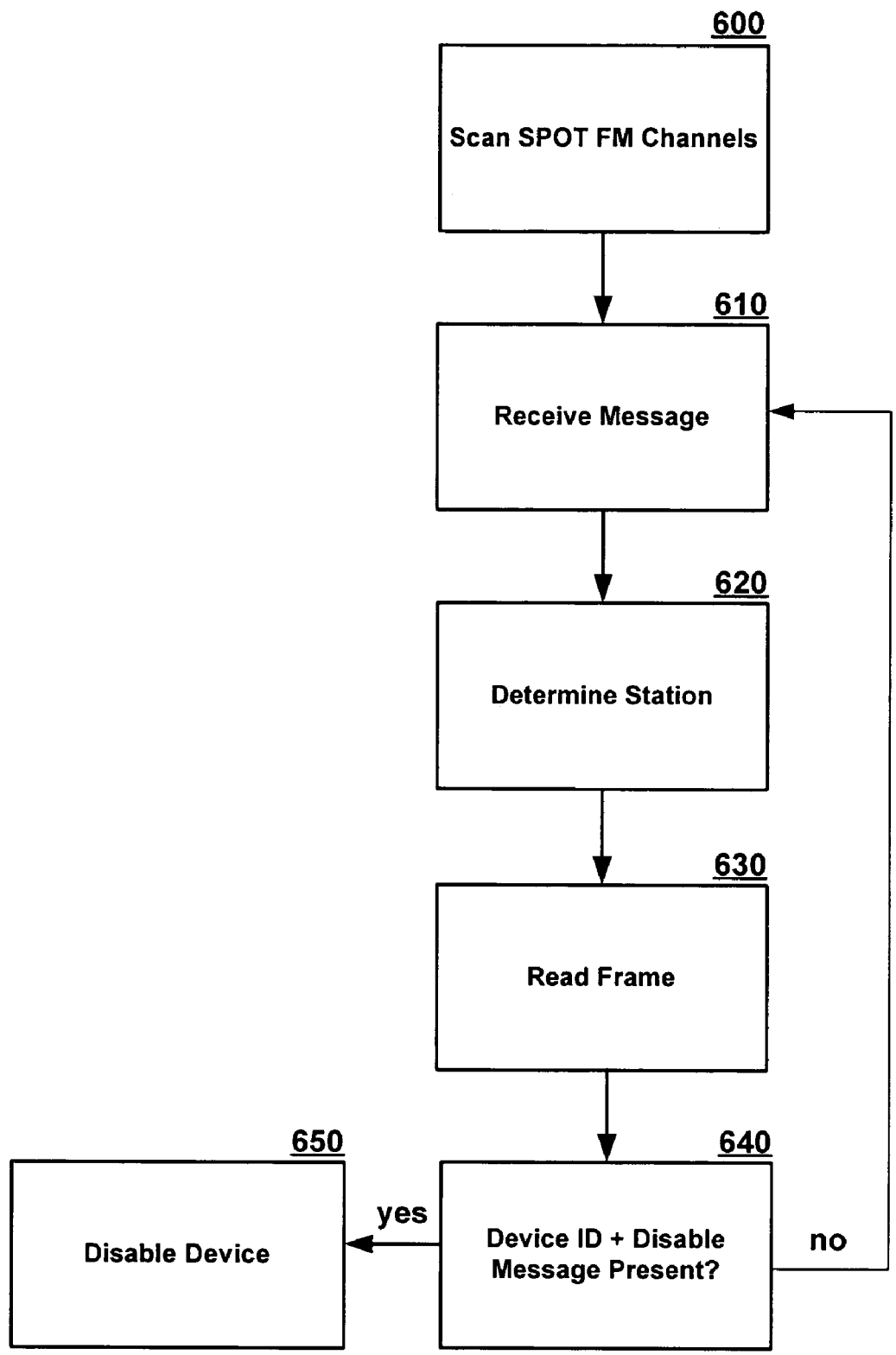
FIG. 6 depicts an exemplary flow diagram of an exemplary embodiment of the invention implemented with the SPOT network.

FIG. 6 illustrates exemplary signaling of a device 300 using a SPOT receiver 320/processor 310 combination. At 600, the device 300 scans for a message on a plurality of pre-identified radio frequencies. When a message is received at 610, the message is processed at 620 to determine a station to which to tune. To further subdivide bandwidth, in one embodiment, IDs are divided among radio station channels. Thus, for instance, if the device has a ID that includes 5 as the first bit, then the device knows to tune to the 5$^{th}$ radio station of those available. At 630, the station is monitored for message frames. The contents of a frame are read. At 640, if the contents include a message identifying the device by its unique ID and the message is a disabling message, then the device disables as described above at 650. If the message is not a disabling message, or not intended for the device, then the message is ignored and the process repeats at 610. In one non-limiting embodiment, a frame includes 112 bytes of data.

In an exemplary non-limiting implementation, for a given reported device, the primary lockdown packets (e.g., disabling signals with Stolen IDs) are transmitted in the location of loss at a rate that decays from 30 times a day to once a day over a period of a month (with an average of 6 transmissions per day), and to zero after 12 months. At any time, the user can opt to refresh the service.

In the examples given where the SPOT network is the network utilized by the invention, lockdown packets are transmitted in every SPOT coverage area worldwide approximately 100 time over a period of a year. Increased frequency of Nationwide or Worldwide transmissions are also available.

As mentioned, the invention is scalable, i.e., the tags, such as the receiver/processor combinations illustrated in FIG. 3, can be included in any device. But some networks are geographically limited, bandwidth limited, or both. With the SPOT network, a network of FM radio towers are used to provide data coverage to SPOT devices. Each tower can support up to 20,000 unique SPOT id's, and transmits a total of ~125 MB of data per day (or approximately 5 KB of targeted data per device in a fully loaded busy population), which enables additional devices to be easily accommodated by the invention without creating new towers or coverage areas. Since tags using the SPOT network do not need to receive significant amounts of data, the bandwidth is not overburdened and lends itself to a scalable system.

There are multiple ways of implementing the present invention, e.g., an appropriate API, tool kit, driver code, operating system, control, standalone or downloadable software object, etc. which enables applications and services to use the remote disabling methods of the invention. In addition to the provision of components in a device that may be lost, the invention contemplates the use of the invention from the standpoint of an API (or other software object), as well as from a software or hardware object that receives a disabling request or issues a disabling command in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to guard against loss or theft. For instance, the algorithm(s) and hardware implementations of the invention may be provided in hardware, or firmware, applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of the SPOT network, the invention is not so limited, but rather may be implemented to provide theft deterrence in connection with any wireless network. For instance, as utilized herein, the term destroyed is intended to describe the state of a device if the processor 310 of a device 300 in accordance with the invention is removed. Should the processor 310 be removed, it will be appreciated that the intent of the invention is that device 300 is no longer operable for its generally intended electronic purpose. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for deterring theft of electronic devices, comprising:
   receiving by a receiver of the device a disabling signal targeting the device remotely via a network, the disabling signal being transmitted at a rate that decreases corresponding to a duration of time that has expired since the device was reported lost;
   in response to receiving the disabling signal, electronically disabling the device via a component of the device that cannot be removed without destroying the device; and
   in response to receiving the disabling signal, transmitting from the device location information corresponding to the device.

2. A method according to claim 1, wherein the network is at least one of a wireless network, a radio broadcast network and a smart personal objects technology (SPOT) network.

3. A method according to claim 1, further comprising:
   in response to receiving the disabling signal, displaying a message via a display of the device.

4. A method according to claim 1, wherein said disabling includes electronically disabling the device by changing the status of at least one connection in the device from one of (a) open to closed and (b) closed to open.

5. A method according to claim 1, wherein said disabling includes electronically disabling at least one subcomponent of the device.

6. A method according to claim 1, wherein said component is a processor and said disabling includes electronically disabling the device by disabling operation of at least a portion of the processor.

7. A method according to claim 1, further including locally entering a pre-defined code to the device to re-enable operation of the device.

8. A method according to claim 1, further including transmitting said disabling signal at least one of (a) as plain text, (b) at least partially encrypted and (c) encoded according to a predetermined format.

9. A method for deterring theft of electronic devices, comprising:
   in response to receiving an indication that a device is lost, adding a unique identifier associated with the device to a list; and
   broadcasting a disabling message targeting the device via at least one transmitter of a network, the disabling message being broadcast at a rate that decreases corresponding to a duration of time that has expired since receiving the indication that the device is lost, such that in response to receiving the disabling message, the device disables via a component of the device that cannot be removed without destroying the device.

10. A method according to claim 9, wherein the network is at least one of a wireless network, a radio broadcast network and a smart personal objects technology (SPOT) network.

11. A method according to claim 9, further comprising:
    receiving information from the device via at least one of (a) the network and (b) a second network to which the device is connected, said information providing a basis for resolving the location of the device; and
    determining a location of the device based on said information.

12. A method according to claim 9, wherein said broadcasting includes periodically broadcasting the disabling message at least one of (a) as plain text, (b) at least partially encrypted and (c) encoded according to a predetermined format.

13. A computing device comprising means for carrying out the method of claim 9.

14. An electronic device, comprising:
    at least one component capable of being disabled via at least one local disabling signal;
    a processing component coupled to the at least one component; and
    a receiver communicatively coupled to said processing component for receiving a remote disabling signal targeting the device via a network, the remote disabling signal being transmitted at a rate that decreases corresponding to a duration of time that has expired since the device was reported lost,
    wherein, in response to said receiver's reception of the remote disabling signal, said processing component electronically disables the device via said at least one component,
    wherein none of said at least one component, said processing component and said receiver can be removed without destroying the device.

15. A device according to claim 14, wherein the network is at least one of a wireless network, a radio broadcast network and a smart personal objects technology (SPOT) network.

16. A device according to claim 14, further comprising:
    a display for displaying a message in response to receiving the remote disabling signal.

17. A device according to claim 14, wherein said at least one component is at least one connection and said processing component electronically disables the device by changing the status of the at least one connection from one of (a) open to closed and (b) closed to open.

18. A device according to claim 14, wherein said at least one component is at least one subcomponent of the device.

19. A device according to claim 14, wherein said at least one component is at least one portion of the processing component and said processing component electronically disables the device by disabling operation of said at least one portion of the processing component.

20. A device according to claim 14, wherein the remote disabling signal is encoded at least one of (a) as plain text, (b) at least partially encrypted and (c) encoded according to a predetermined format.

21. A device according to claim 14, further comprising:
    a transmitter for transmitting information over at least one of (a) the network and (b) a second network to which the device is connected, said information providing a basis for resolving the location of the device.

22. A device according to claim 21, wherein said information includes at least one of an Internet Protocol address and a MAC (media access control) address.

23. A computing device, comprising:
- means for receiving by the device a disabling signal targeting the device remotely via a network, the disabling signal being transmitted at a rate that decreases conesponding to a duration of time that has expired since the device was reported lost;
- means for electronically disabling, in response to receiving the disabling signal, the device via a component of the device that cannot be removed without destroying the device; and
- means for transmitting from the device, in response to receiving the disabling signal, location information corresponding to the device.

24. A computer readable medium comprising computer executable modules having computer executable instructions for performing the following steps:
- in response to receiving an indication that a device is lost, adding a unique identifier associated with the device to a list; and
- broadcasting a disabling message targeting the device via at least one transmitter of a network, the disabling message being broadcast at a rate that decreases conesponding to a duration of time that has expired since receiving the indication that the device is lost,
- such that in response to receiving the disabling message, the device disables via a component of the device that cannot be removed without destroying the device.

25. A computer readable medium comprising computer executable modules having computer executable instructions for performing the following steps:
- receiving by a receiver of the device a disabling signal targeting the device remotely via a network, the disabling signal being transmitted at a rate that decreases corresponding to a duration of time that has expired since the device was reported lost;
- in response to receiving the disabling signal, electronically disabling the device via a component of the device that cannot be removed without destroying the device; and
- in response to receiving the disabling signal, transmitting from the device location information corresponding to the device.

* * * * *